(12) United States Patent
Prajapati et al.

(10) Patent No.: US 6,421,880 B1
(45) Date of Patent: Jul. 23, 2002

(54) ROCK DRILL HANDLE

(76) Inventors: Kamlesh Bhagwanbhai Prajapati, 607 Tackaberry Drive, North Bay, Ontario (CA), P1B 9LZ; Petrus Albertus Jozef Hes, 13 Azalea Avenue, Roodekrans, Roodepoort (ZA)

( * ) Notice: Subject to any disclaimer, the term of this patent is extended or adjusted under 35 U.S.C. 154(b) by 0 days.

(21) Appl. No.: 09/501,343

(22) Filed: Feb. 9, 2000

(51) Int. Cl.[7] .......................... B25D 17/00; B25D 17/24
(52) U.S. Cl. ................... 16/431; 173/162.1; 173/162.2
(58) Field of Search .......................... 173/162.2, 162.1, 173/210, 211, 212, 112, 113; 16/431, DIG. 12, DIG. 19; 280/602

(56) References Cited

U.S. PATENT DOCUMENTS

| | | | | |
|---|---|---|---|---|
| 4,282,938 A | * | 8/1981 | Minamidate | 173/162.2 |
| 4,401,167 A | * | 8/1983 | Sekizawa et al. | 173/162.2 |
| 4,478,293 A | * | 10/1984 | Weilenmann et al. | 173/162.2 |
| 4,711,308 A | * | 12/1987 | Blaas et al. | 173/162.2 |
| 4,800,965 A | * | 1/1989 | Keller | 173/162.2 |
| 5,025,870 A | * | 6/1991 | Gantner | 173/162.2 |
| 5,052,500 A | * | 10/1991 | Ohtsu | 173/162.2 |
| 5,400,860 A | * | 3/1995 | Best et al. | 173/162.2 |
| 5,522,466 A | * | 6/1996 | Harada et al. | 173/162.2 |
| 5,697,456 A | * | 12/1997 | Radle et al. | 173/162.2 |
| 5,750,272 A | * | 5/1998 | Jardine | 428/686 |
| 5,779,257 A | * | 7/1998 | Bonvallet et al. | 280/602 |
| 5,839,517 A | * | 11/1998 | Gwinn et al. | 173/162.2 |
| 6,076,616 A | * | 6/2000 | Kramp et al. | 173/162.2 |
| 6,148,930 A | * | 11/2000 | Berger et al. | 173/162.2 |

FOREIGN PATENT DOCUMENTS

| | | | | |
|---|---|---|---|---|
| DE | 3148226 A1 | * | 6/1983 | F16F/15/04 |
| DE | 19503526 A1 | * | 8/1996 | B23B/45/16 |
| GB | 2086005 A | * | 5/1982 | F16F/7/10 |
| GB | 2092938 A | * | 8/1982 | B25D/17/24 |
| GB | 2297514 A | * | 8/1996 | B25D/17/04 |
| WO | WO-89/07188 | * | 8/1989 | E21B/15/00 |

* cited by examiner

Primary Examiner—Lynne H. Browne
Assistant Examiner—Doug Hutton
(74) Attorney, Agent, or Firm—Dorsey & Whitney LLP

(57) ABSTRACT

The invention concerns a rock drill handle which is connectable to a hand-held rock drill and which includes vibration damping means to damp the transmission of at least back and forth vibrations from the drill to the hand of an operator gripping the handle. In the preferred embodiments, the handle comprises operatively forwardly located connecting means connectable to the backhead of the drill, an operatively rearwardly located handle section and at least one linking section which extends rearwardly from the connecting means to the handle section, the linking section including damping means.

13 Claims, 7 Drawing Sheets

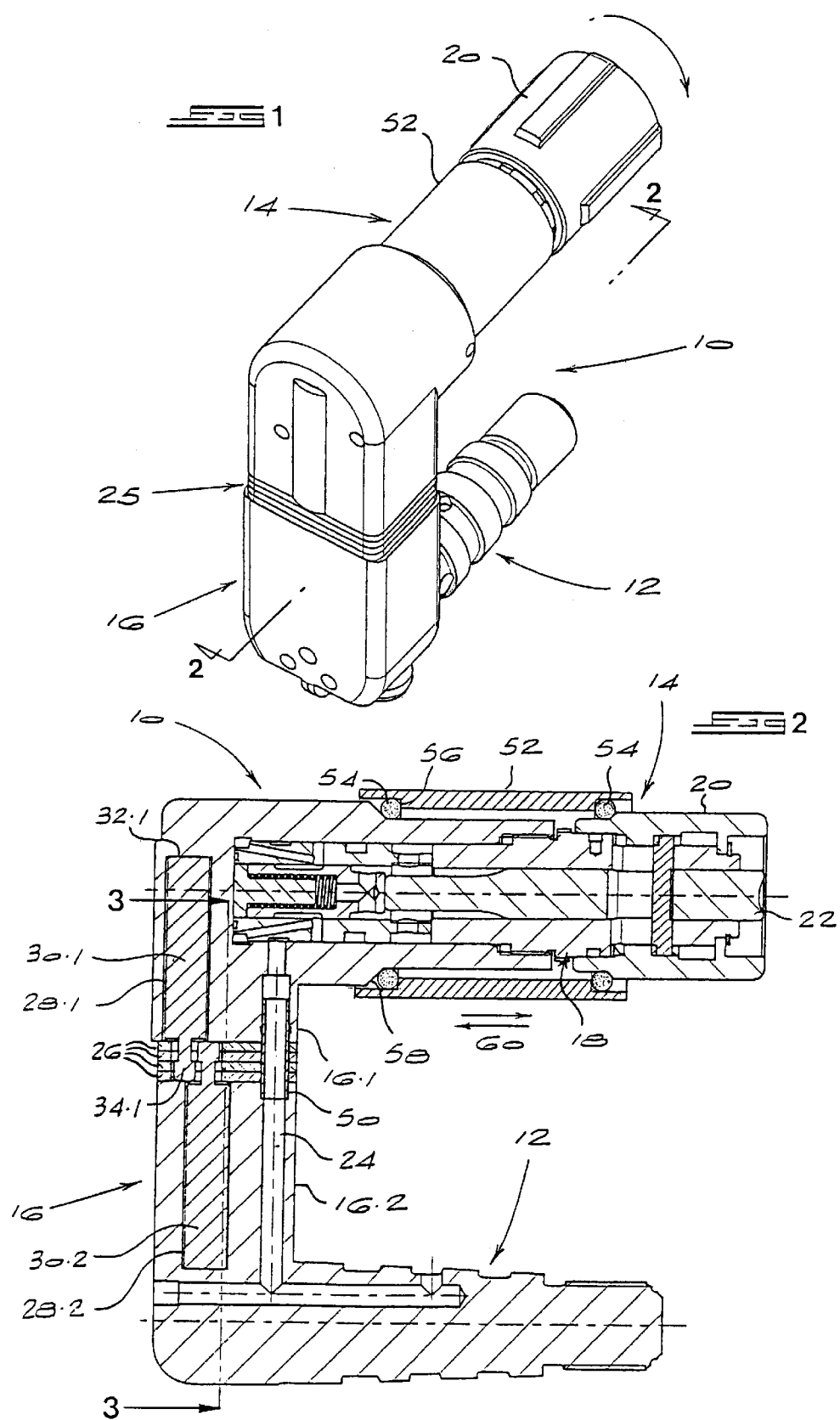

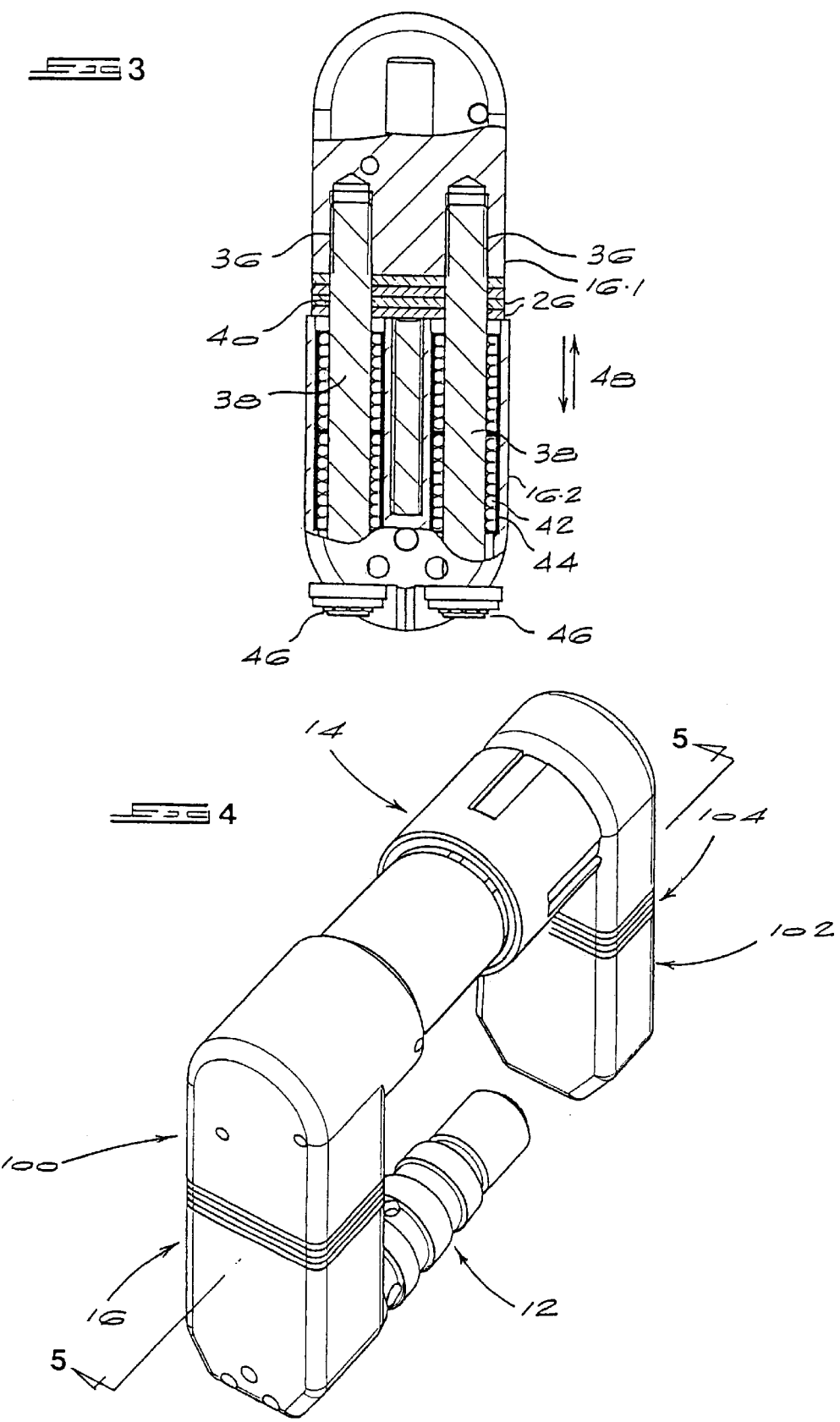

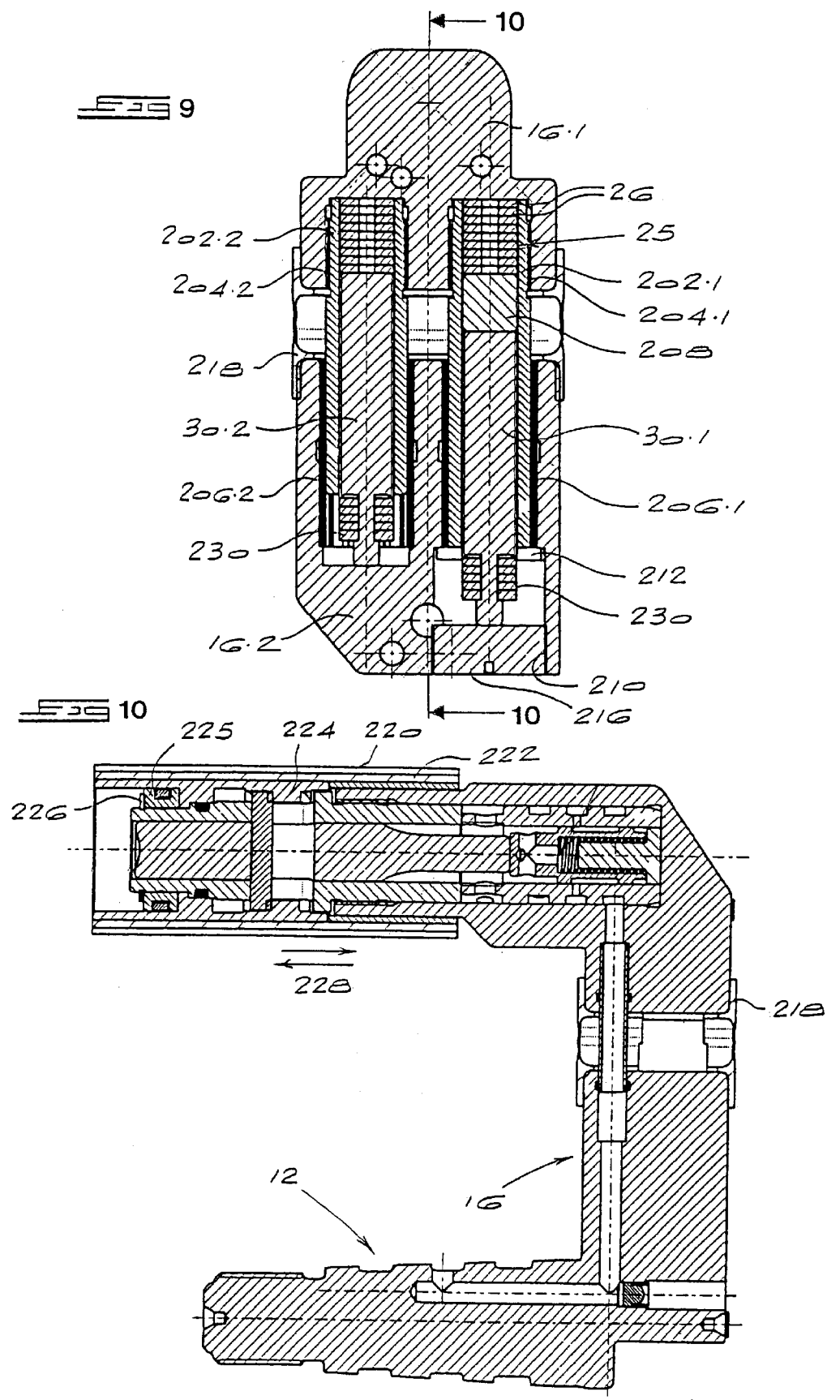

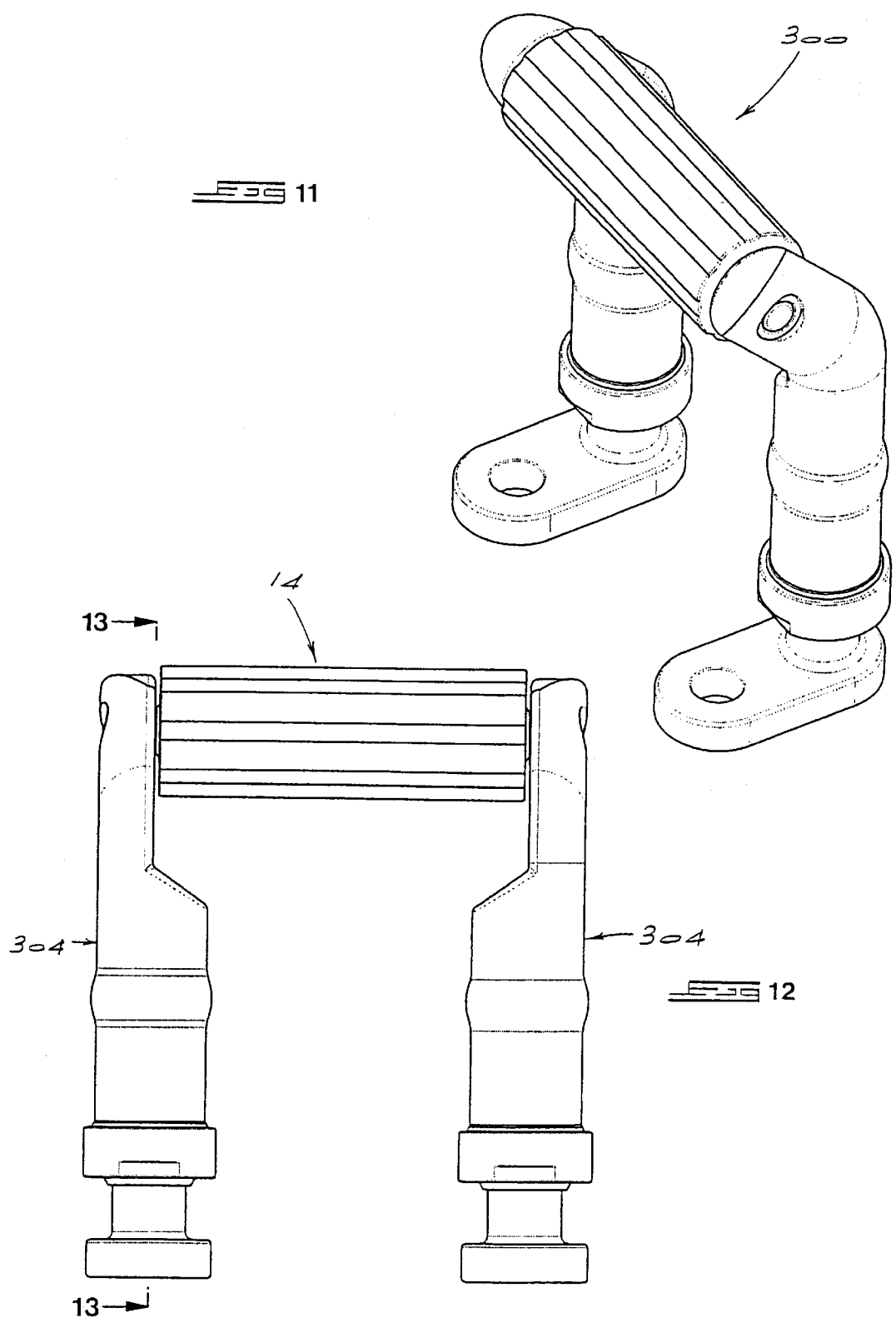

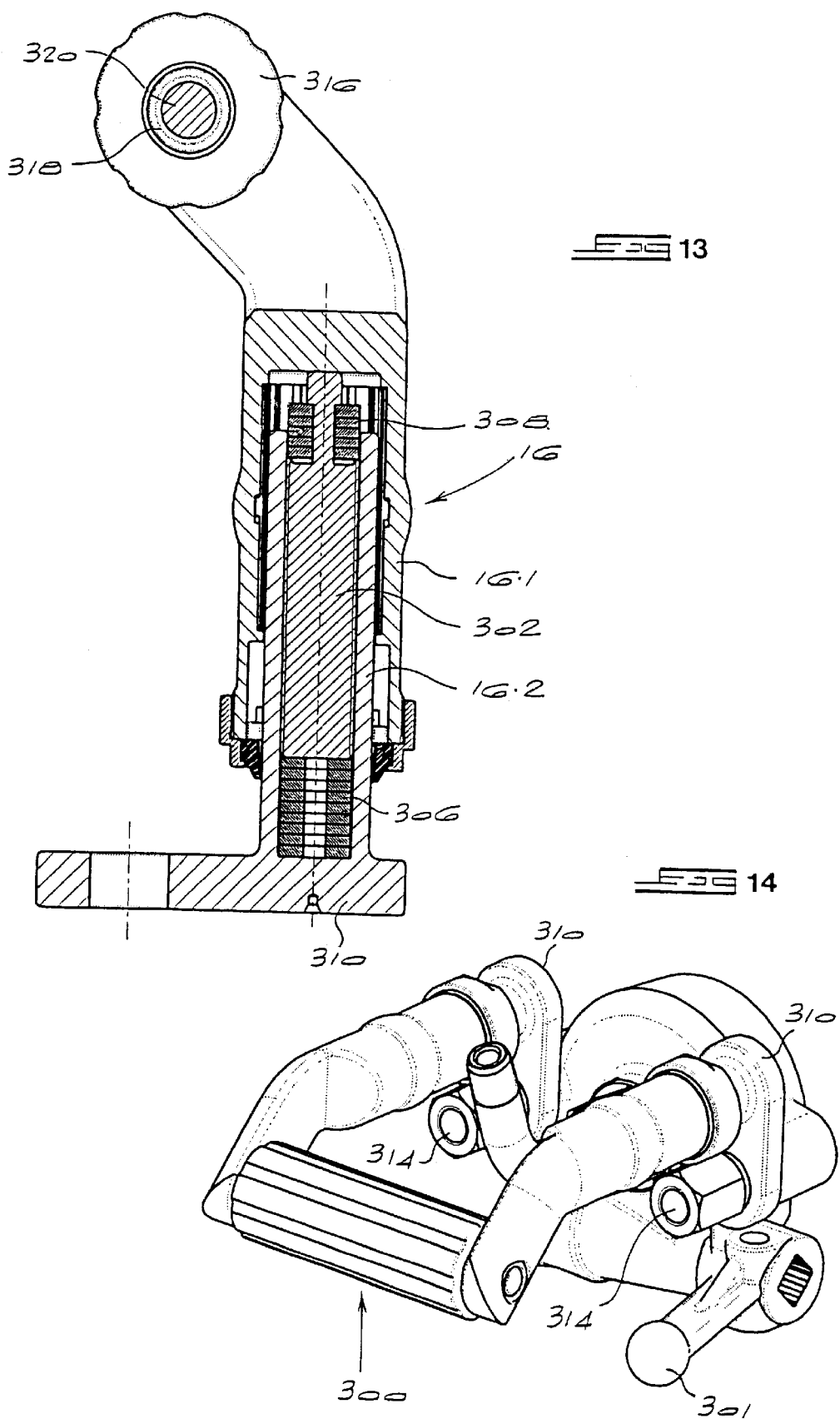

ROCK DRILL HANDLE

BACKGROUND OF THE INVENTION

This invention relates to a rock drill handle.

Considerable attention has been paid in recent times to the detrimental physiological effects of vibration from machines such as hand-held rock drills. Research has shown that prolonged exposure to the vibrations generated by hand-held rock drills can lead to so-called "white finger," HAVS (hand/arm vibration syndrome) or Raynaud's disease, in bad cases, resulting in loss of or diminished feeling and possibly even eventual gangrene.

It would clearly be desirable to provide for diminished transmission of vibrations to the operator of a rock drill.

SUMMARY OF THE INVENTION

According to the present invention, there is provided a rock drill handle which is connectable to a hand-held rock drill and which includes vibration damping means to damp the transmission of at least back and forth vibrations from the drill to the hand of an operator gripping the handle.

In the preferred embodiments, the handle comprises operatively forwardly located connecting means connectable to the backhead of the drill, an operatively rearwardly located handle section and at least one linking section which extends rearwardly from the connecting means to the handle section, the linking section including vibration damping means.

The vibration damping means may act between respective portions of the, or each, linking section which are movable relative to one another in a back and forth direction. Typically, the vibration damping means comprises a plurality of resilient damping pads. These damping pads may be made of materials selected to damp out vibrations at different frequencies.

The vibration damping means may also comprise one or more hydraulic or pneumatic dampers and/or one or more active dampers to provide a positive damping action in response to vibrations generated during drilling with the rock drill.

In certain embodiments of the invention in which the handle section extends transversely from the, or each linking section, the handle section may include a hand-rip portion which is gripped in use by the operator and which is capable of side-to-side movement relative to the linking section.

The terms "rearward," "forward" and the like have reference to the forward drilling direction. The term "back and forth" has reference to movements in the forward/rearward direction. The term "side-to-side" is used with reference to movements transverse to that direction, i.e., from side-to-side as experienced by an operator behind the rock drill.

BRIEF DESCRIPTION OF THE DRAWINGS

The invention will now be described in more detail, by way of example only, with reference to the accompanying drawings in which:

FIG. 1 shows a perspective view of a rock drill handle according to this invention;

FIG. 2 shows a cross-sectional view of the FIG. 1 handle at line 2—2 in FIG. 1.

FIG. 3 shows a cross-section at the line 3—3 in FIG. 2;

FIG. 4 shows a perspective view of a second embodiment of rock drill handle according to the invention;

FIG. 9 shows a cross-section at the line 9—9 in FIG. 8;

FIG. 10 shows a cross-section at the line 10—10 in FIG. 9;

FIG. 11 shows a perspective view of a fourth embodiment of the invention;

FIG. 12 shows an end view of the handle seen in FIG. 11;

FIG. 13 shows a cross-section at the line 13—13 in FIG. 12; and

FIG. 14 shows the embodiment of FIGS. 11 to 13 fitted to the backhead of a rock drill.

DESCRIPTION OF PREFERRED EMBODIMENTS

Figure 5:
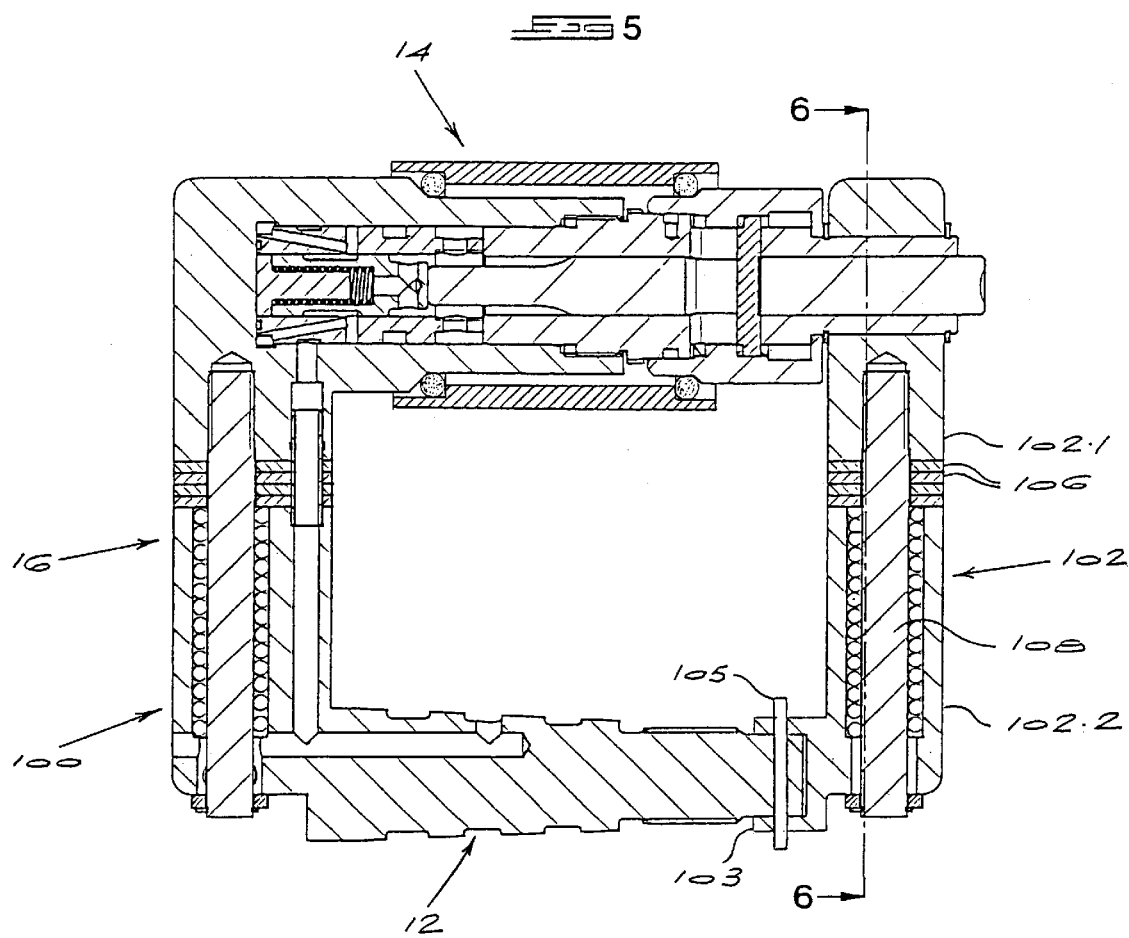
FIG. 5 shows a cross-sectional view of the FIG. 4 handle at line 5—5 in FIG. 4.

A first embodiment of rock drill handle according to this invention is shown in FIGS. 1 to 3 of the drawings. The handle 10 includes a connecting section 12 which is, in use of the handle, located in a forward position and engaged in conventional manner in an opening in the backhead (not shown) of a hand-held pneumatic rock drill (also not shown).

The handle 10 also includes a rearwardly located, transversely extending handle section 14. The connecting section 12 is joined to the handle section by a rearwardly extending linking section 16 which includes aligned portions 16.1 and 16.2. It will be understood that the linking section 16 extends in a forward/rearward direction in use.

The handle section 14 accommodates a dual control valve arrangement 18 of the type described in the specification of PCT/IB99/000677. Since the nature of the dual control valve arrangement forms no part of the present invention, it will not be described here in any detail. It suffices for present purposes to say that the arrangement is operable in a first mode to control the supply of pressurized air to the air leg of the rock drill, thereby to control the magnitude of the drilling thrust supplied by the air leg, and in a second mode to redirect the flow of compressed air to the air leg to achieve retraction thereof, for instance, when respragging is necessary. The first mode of operation is achieved by rotation of a twist-grip 20 at the end of the handle section 14. The second mode of operation is achieved by depression of a plunger 22 located axially within the handle section and accessible through the open end of the twist grip.

The numeral 24 in FIG. 2 indicates air flow passages (only one visible) which extend within the connecting section 12 and linking section 16 and which, in use, supply compressed air under the control of the valve arrangement to the air leg.

The two portions 16.1 and 16.2 are separate components which are not connected solidly to one another. Located between the adjacent ends of these portions is a stack 25 of resilient damping pads 26.

The portions 16.1, 16.2 are formed with blind cylindrical bores 28.1, 28.2 which accommodate opposed dampers 30.1, 30.2. Taking, for example, the portion 16.1 and its associated damper 30.1, one end of the damper cylinder seats on the base 32.1 of the bore 28.1 and the opposite end extends through aligned holes in the pads 26 and bears upon the opposing end surface of the other portion 16.2.

The portion 16.1 is formed with tapped holes 36. Pins 38 which hold the portions 16.1, 16.2 in alignment with one another have threaded ends which are screwed into these holes. The pins extend through openings 40 in the pads 26 and through linear bearings 42 located in cylindrical passages 44 in the portion 16.2. Extremities of the pins project from that end of the portion 16.2 adjacent the connecting section 12 and are engaged there by circlips 46.

With the arrangement described above, it will be understood that the portions 16.1, 16.2 can move back and forth relative to one another, such movement being accommodated by sliding movement of the alignment pins 38 in the bearings 42 and by compression or expansion of the damping pads 26, as indicated in FIG. 3 by the arrows 48.

The damping pads 26 and dampers 30.1, 30.2 in combination act as damping means to damp back and forth vibration components which are generated by the rock drill during operation. These pads and dampers accordingly serve to reduce the transmission of back and forth vibration components from the rock drill to the hand of an operator which grips the handle section 14.

In practice, the individual pads 26 may be made of different materials selected to filter out vibrations at different frequencies. At least some of the pads may, for instance, be made of different grades SORBOTHANE(urethane materials in semifinished form) and/or MICROSORB (elastomeric materials) (trade marks of Sorbothane, Inc.) and/or some of the pads may be made of suitable grades of polyurethane. The dampers 30.1, 30.2 may, for instance, be pneumatic or hydraulic dampers.

Referring again to FIG. 2, it will be noted that sleeves 50 (only one visible) extend through the damping pads 26 to form portions of the air flow passages 24 which traverse the pads.

Located sidably over a central region of the handle section 14 is a sleeve 52 (shown with an exaggerated diameter in FIG. 2) which is, in use, gripped in the hand of the operator. Resilient annular elements 54 of rubber or the like are located between shoulders 56 on he sleeve and opposing shoulders 58 on the handle section. The resilience of the elements 56 permits limited side-to-side movement of the sleeve on the handle section as indicated by the arrows 60. The elements 56 accordingly act as dampers to reduce the transmission, to the operator's hand, of side-to-side vibration components generated by the rock drill.

Figure 6:
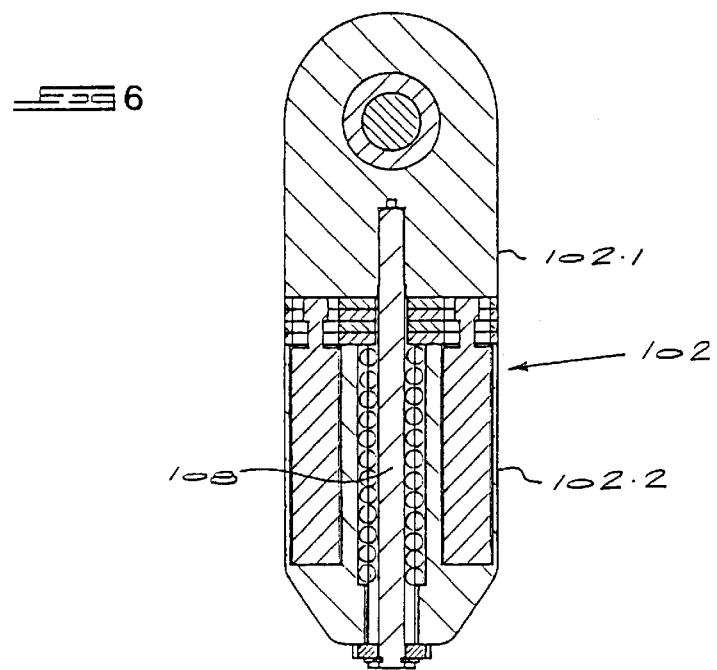
FIG. 6 shows a cross-section at the line 6—6 in FIG. 5.
Figure 7:
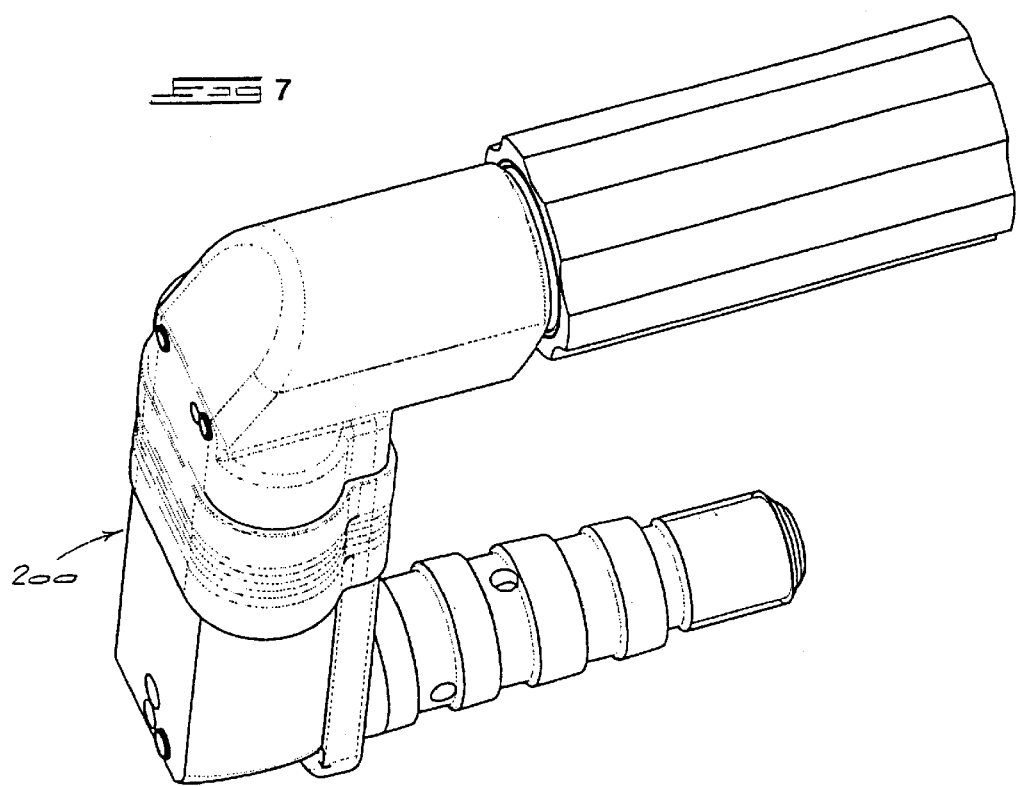
FIG. 7 shows a perspective view of a third embodiment of the invention.
Figure 8:
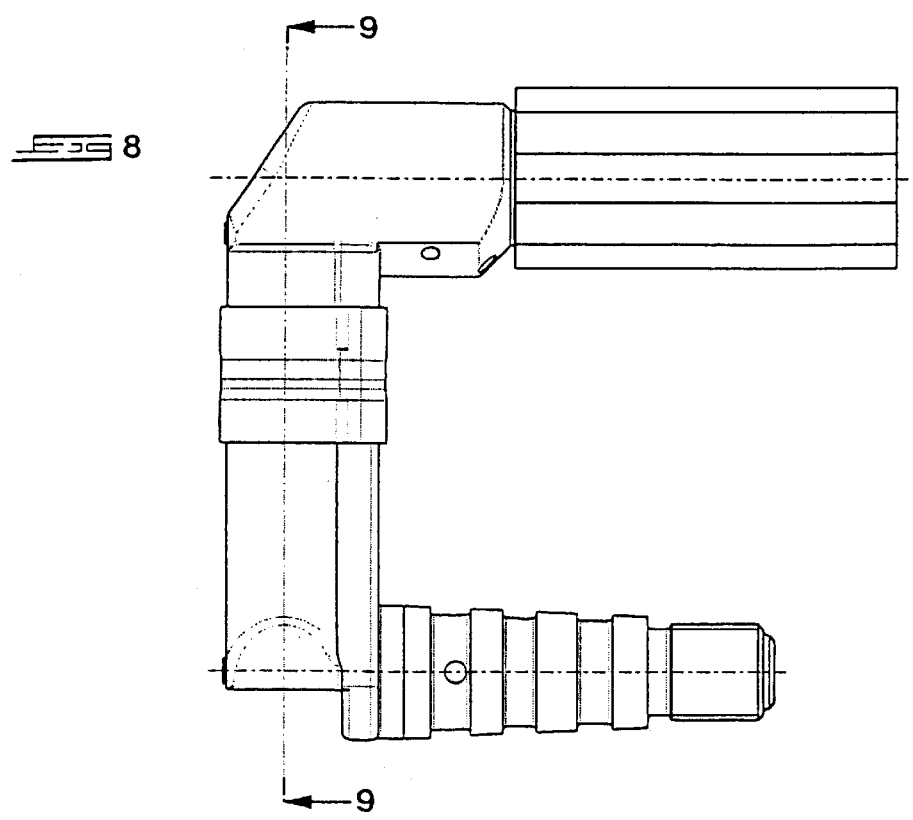
FIG. 8 shows a side view of the FIG. 7 handle.

FIGS. 4 to 6 of the drawings illustrate a second embodiment of handle, designated 100, which includes a connecting section 12, handle section 14 and linking section 16 similar to those described above. In addition, the handle 100 has a second linking section 102 which is parallel to the linking section 16 and extends in a forward/rearward direction. As illustrated, a clevis 103 at the end of the section 102 (seen in FIG. 5 only) is connected to the end of the connecting section 12 by a transverse pin 105. The additional linking section 102 increases the robustness and balance of the handle compared to the first embodiment.

Like the linking section 16, the linking section 102 has two aligned portions 102.1, 102.2 which are damped with respect to one another by a stack 104 of damping pads 106 similar to the pads 26. A pin 108 corresponding to the pins 38 holds the portions 102.1, 102.2 in alignment with one another while allowing relative movement to take place between them. Although FIGS. 4 to 6 do not illustrate dampers corresponding to the dampers 30.1, 30.2 acting between the portions 102.1, 102.2, it will be understood that dampers of this kind can be included to enhance the damping of back and forth vibration components in the linking section 102.

FIGS. 7 to 10 illustrate a third embodiment 200 of the invention. Components corresponding to those present in the previously described embodiments are indicated with the same reference numerals.

The main difference between the third embodiment and the earlier embodiments is the arrangement of the damping means to damp back and forth vibration components. In this embodiment, stacks 25 of damping pads 26 are located at the ends of the dampers 30.1, 30.2.

Thus it will be appreciated that whereas the damping pads in the first embodiment may be considered to be arranged in parallel with the dampers, the corresponding pads in this embodiment are arranged in series with the dampers. As in the earlier embodiments, the pads 26 in this embodiment may be made of different materials designed to filter out vibrations at different frequencies.

The alignment pins of the earlier embodiments are replaced in this embodiment by hollow guide and alignment tubes 202.1, 202.2 in which the damping pads 26 and dampers 30.1, 30.2 are located and which extend in bores in the portions 16.1, 16.2. The tubes are externally threaded at one end and are screwed into threaded sections 204.1, 204.2 of the bores in the portion 16.1. The tubes are slidable in linear bearings 206.1, 206.2, in this case IGLIDUR (plastic material products) bearings, in the portion 16.2. A plastics spacer 208 is located in the tube 202.1 between the rear end of the damper 30.1 and the stack 25 of pads 26.

During assembly, the tube 202.2 is screwed into the bore section 204.2 and the associated pads 26 and damper 30.2 are located in the tube. The portion 16.2 is then placed over the tube and damper assembly. The relevant pads 26, the spacer 208 and the damper 30.1 are placed in the tube 202.1 which is then inserted through an opening 210 in the portion 16.2. The end of the tube 202.1 is then screwed home in the bore section 204.1 in the portion 16.1. This operation is facilitated by a radially slotted annulus 212 at the end of the tube 202.1 which is engageable by a suitable spanner. Finally, a threaded plug 216 is screwed into the opening 210 to bear against the end of the damper 30.1.

In the final assembly, the tubes 202.1, 202.2 hold the portions 16.1, 16.2 in alignment with one another while allowing relative back and forth movement to take place between them.

There is a gap between the adjacent ends of the portions 16.1, 16.2. This is covered by a resilient, bellows-like sleeve 218 the ends of which are fixed to the portions 16.1, 16.2 with a suitable adhesive to reduce the chances of a finger getting pinched between the adjacent ends of the portions 16.1, 16.2 as these ends move towards and apart from one another during operation of the rock drill.

The assembly described above has several advantages compared to the corresponding assembly used in the earlier embodiments. The series as opposed to parallel configuration of the damping pads 26 and dampers 30.1, 30.2 provides an enhanced damping effect, and the placement of the pads and dampers within the guide and alignment tubes results in a more compact arrangement. Also it will be noted that in this embodiment the assembly has no projecting pin ends and circlips as in the earlier embodiments.

Referring to FIG. 10, it will also be seen that the handle section 14 is configured differently to that in the earlier embodiments. In this case, there is a continuous nitrile rubber grip 220 which is formed with longitudinally extending flutes to assist manual gripping. The grip 220 is bonded to a polyurethane insert 222 aligned with a steel sleeve 224. The sleeve 224 is locked axially in position by a spring clip 225 and a circlip 226. With this arrangement, the assembly of grip 220 and polyurethane insert 222 is capable of sliding from side-to-side, as illustrated by the arrows 228, relative to the remainder of the handle, to damp side to side vibration components during drilling.

Releasing the spring clip 225 and the circlip 226 allows the steel sleeve 224 to be slipped out and thereafter the assembly of grip 220 and insert 222 to be removed, thereby giving access to the internal valve components, which are similar to those of the earlier embodiments, for repair or replacement.

It will also be noted in this embodiment that there is a stack of rubber washers 230 around 20 the head of each damper 30.1, 30.2.

FIGS. 11 to 14 illustrate a fourth embodiment 300 of the invention. Whereas all of the embodiments described previously include a dual valve arrangement, this embodiment is intended for use with rock drills having a separate air leg control valve, indicated with the numeral 301 in FIG. 14.

The embodiment of FIGS. 11 to 14 has a single damper 302 in each linking section 16. The internal arrangement of the damper 302, resilient damping pads 306 and rubber washers 308 in each linking section 16 is similar to that described for FIGS. 7 to 10. It will, however, be noted that the linking section 16 in this embodiment does not have portions which are axially aligned but spaced apart from one another as in earlier embodiments. Instead, the corresponding portions in this embodiment are arranged telescopically, with the internal vibration damping components housed in the portions 16.2, each of which is in the form of a sleeve 304 extending from a bracket 310 into the portion 16.1.

As shown in FIG. 14, the bracket 310 is bolted to the backhead of a rock drill by bolts 314. Thus the brackets 310 in this embodiment serve a function corresponding to that of the connecting section 12 in the earlier embodiments.

Because the handle 300 does not incorporate the aforementioned dual valve apparatus, it can be considerably simpler in design than the previous embodiments. In this case the handle section 14 includes a resilient sleeve 316 which is mounted on a rubber bush 318 on a pin 320 which spans between the linking sections 16.

In all embodiments described above, the diameter of the handle section 14 is carefully selected with ergonomic considerations in mind so that the operator can obtain a strong and comfortable grip.

Reference is made above to the use of pneumatic or hydraulic dampers 30.1, 30.2. It will be understood that dampers of this type are passive in nature. For optimal vibration damping, it is possible to use active dampers, which will provide a positive damping action in response to the particular vibrations which are generated during drill operation. It is believed that magnetostrictive dampers, piezoelectric dampers and/or magnetorheological dampers could be used to advantage. In some cases, it is envisaged that an active damper, such as a piezoelectric damper, could additionally serve as a heat source. Heat produced by the source could be used to warm the operator's hand and/or for other purposes such as de-icing of the drill muffler.

In practice, many of the components described above could be made of suitably robust grades of plastic materials to reduce the overall mass of the handle structure compared to a structure made predominantly of steel components.

We claim:

1. A rock drill handle for a pneumatic, hand-held rock drill having a backhead and a pneumatic air leg, the handle comprising:

a forwardly located connecting section connectable to the backhead of the rock drill;

a rearwardly located handle section which is gripped manually in use by an operator, the handle section including an internal, pneumatic air leg control valve for controlling the operation of the air leg;

a linking section extending in a rearward direction from the connecting section to the handle section, the linking section including separate forward and rearward portions rigidly connected to the connecting section and the handle section respectively, the forward and rearward portions being aligned with and spaced apart from one another to accommodate relative movements towards and away from one another in response to vibrations generated by the rock drill in use;

vibration damping means to damp relative movements between the forward and rearward portions of the linking section; and compressed air passages which extend through the linking section from the air leg control valve in the handle section to the connecting section and which are variable in length to accommodate relative movements of the forward and rearward portions of the linking section.

2. A rock drill handle according to claim 1 wherein the vibration damping means comprises a plurality of resilient damping pads.

3. A rock drill handle according to claim 2 wherein respective resilient damping pads are made of different materials selected to damp out vibrations at different frequencies.

4. A rock drill handle according to claim 1 wherein the vibration damping means comprises one or more hydraulic or pneumatic dampers.

5. A rock drill handle according to claim 1 wherein the vibration damping means comprises one or more active dampers to positively damp relative movements of the portions of the linking section relative to one another.

6. A rock drill handle according to claim 5 comprising one or more magnetorestrictive, piezoelectric or magnetorheological dampers.

7. A rock drill handle according to claim 6 comprising a piezoelectric damper arranged to act as a heat source for the hand of an operator of the rock drill.

8. A rock drill handle according to any one of the preceding claims wherein the handle section extends transversely from the linking section and includes a hand-grip portion which is gripped in use by the operator and which is capable of side to side movement relative to the linking section.

9. A rock drill handle according to claim 1 and comprising rigid alignment means in the linking section to maintain the forward and rearward portions of the linking section in alignment with another while allowing those portions to move towards and away from one another.

10. A rock drill handle according to claim 9 wherein the rigid alignment means comprises at least one rigid tube which is fixed to one portion and slidable relative to the other portion, the tube accommodating the vibration damping means.

11. A rock drill handle according to claim 10 wherein the vibration damping means comprises resilient damping pads arranged in series in each tube with a pneumatic or hydraulic damper.

12. A rock drill handle according to claim 1 wherein the compressed air passages include a sleeve telescopically received within the linking section to accommodate relative movements of the forward and rearward portions of the linking section.

13. A rock drill handle according to claim 1 wherein the vibration damping means includes a plurality of resilient damping pads and the compressed air passages include a sleeve extending through the damping pads, the sleeve being telescopically received within the linking section to accommodate relative movements of the forward and rearward portions of the linking section.

* * * * *